United States Patent [19]

Chu

[11] 4,017,903
[45] Apr. 12, 1977

[54] PULSE CODE MODULATION RECORDING AND/OR REPRODUCING SYSTEM

[75] Inventor: Peter F. Chu, Poway, Calif.

[73] Assignee: Hewlett-Packard Company, Palo Alto, Calif.

[22] Filed: Aug. 27, 1975

[21] Appl. No.: 608,139

[52] U.S. Cl. .................................. 360/40; 360/44
[51] Int. Cl.² .......................................... G11B 5/09
[58] Field of Search ......... 360/40, 44; 340/347 DD

[56] References Cited
UNITED STATES PATENTS

| | | | |
|---|---|---|---|
| 3,108,265 | 10/1963 | Moe | 360/40 |
| 3,641,524 | 2/1972 | Norris | 360/40 |
| 3,852,809 | 12/1974 | Coker, Jr. | 360/40 |
| 3,921,210 | 11/1975 | Halpern | 360/40 |

Primary Examiner—Vincent P. Canney
Attorney, Agent, or Firm—David A. Boone

[57] ABSTRACT

A system for high-density data recording at low tape speeds receives a unipolar signal representing encoded digital data and transforms it to a bipolar signal having a constant pulse width. The low-frequency response required of the system is minimized because the power spectrum of the signal is altered through a time domain transformation. The narrow bandwidth enables the use of very low tape speeds at high bit packing densities. Tape speeds of 15/32 ips or less at densities about 20 thousand (k) bits per inch (BPI) are possible. The spectrum of the transformed code has no direct current (DC) component which eliminates the need for a base line compensator in the reproducing portion of the system.

10 Claims, 4 Drawing Figures

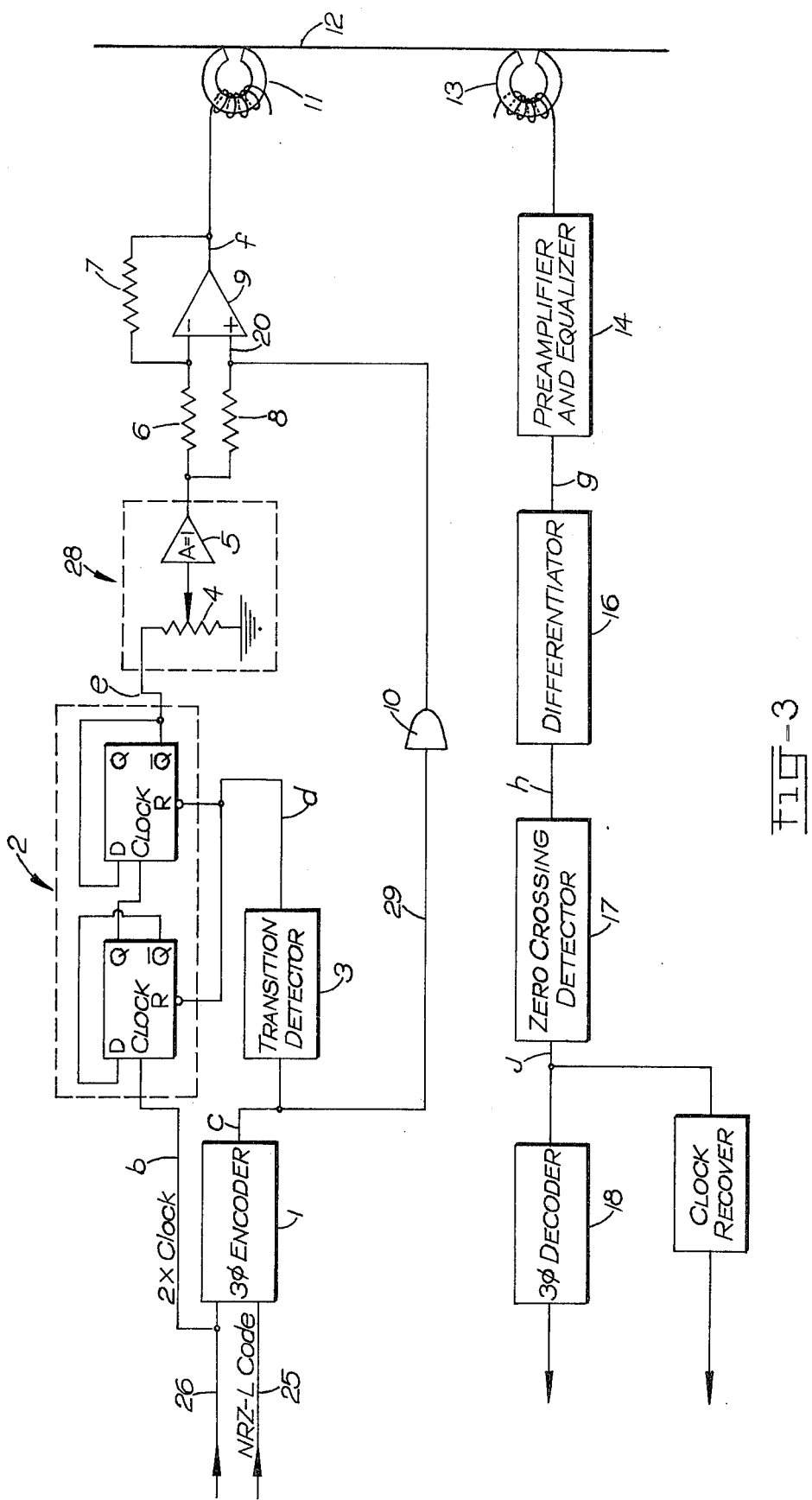

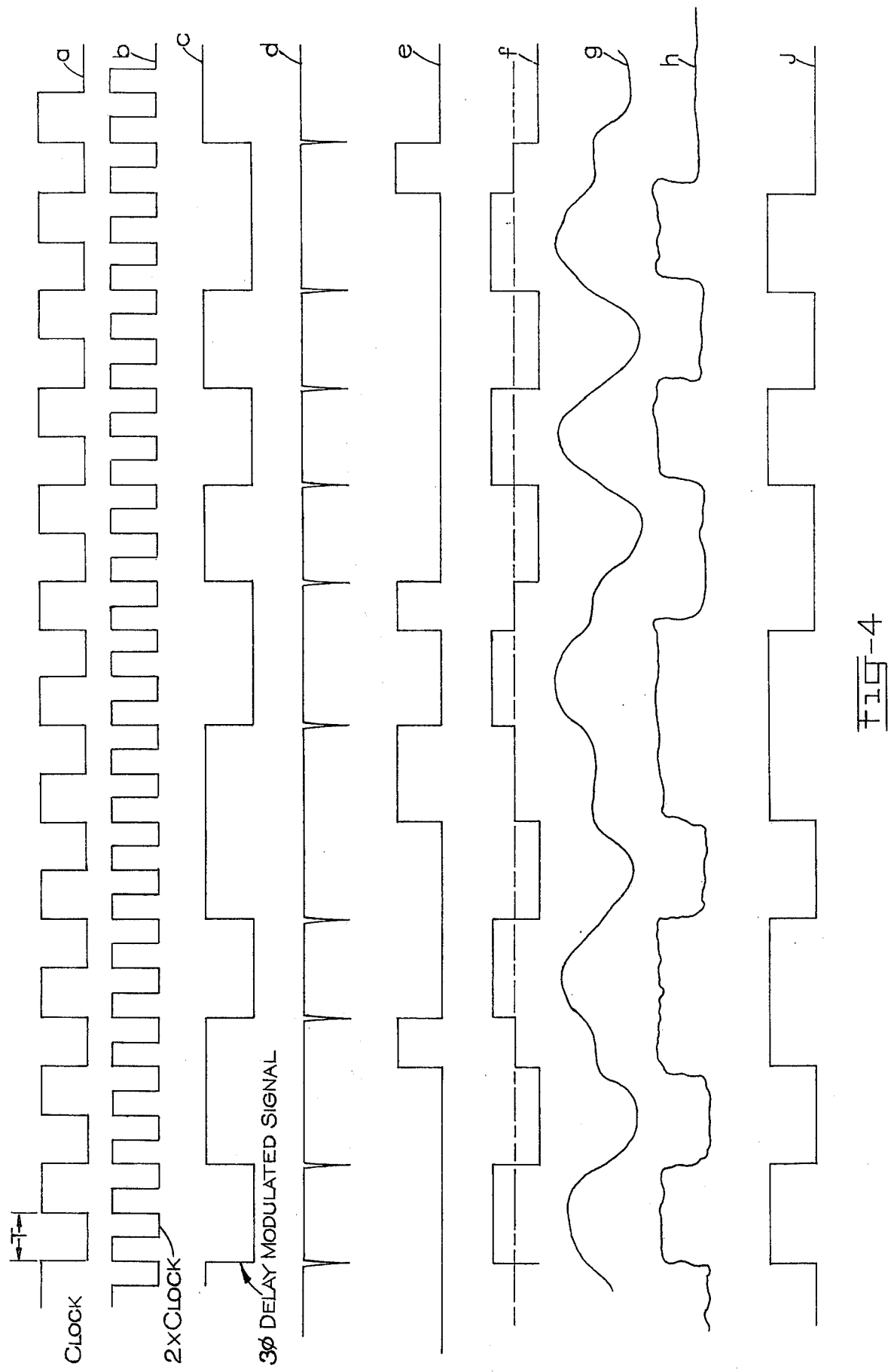

PULSE CODE MODULATION RECORDING AND/OR REPRODUCING SYSTEM

BACKGROUND OF THE INVENTION

Generally, coded information in a digital computer is represented by an electrical signal which periodically represents one of two binary states. This information may be stored on a magnetic medium such as a tape, or transmitted through a medium such as a phone line. This binary information is represented on magnetic tape by a pattern of magnetic flux changes.

When a magnetic tape is used, in the interest of economy as well as increased system efficiency and capacity, it is desirable to record as many bits of information as possible per unit length of the magnetic tape. However, the electrical and mechanical limitations of the recording and reproducing system operate to limit the flux change density obtainable. Therefore, many efforts have been made to produce codes which represent the maximum amount of digital data with the fewest possible flux changes. Some of these pulse code modulation (PCM) codes are described below in their approximate chronological order. Waveforms of some of these codes are shown in FIG. 1.

In addition to maximizing bit density, it is also desirable to provide a system which will operate over a very wide range of tape speeds. While the data processing field generally attempts to maximize both density and speed to achieve the maximum data transfer rate possible, there are many applications in fields such as data acquisition where it is imperative that the data be taken and analyzed at greatly different speeds. For example, consider an application where the temperature of an ocean is being monitored. It is desirable to provide a very low recording speed at high density so that data from many days can be recorded on a single tape. However, in analyzing the data, it is desirable to replay the recorded information in minutes. Conversely, analysis of phenomena such as explosions will require a very high recording speed but a much slower playback rate when the data is to be analyzed. For these reasons, a system which provides a very high recording density and a wide range of tape speeds is very desirable. Also, it is obvious that the lowest speed of the recording system determines the maximum recording time for a tape of a given length.

The present invention enables high density digital recording at very low tape speeds. A bipolar format is used to eliminate the DC component and allow low-speed recording. However, contrary to prior art solutions, bit packing density is retained at a maximum of one flux change per bit of information recorded. Some prior art recording techniques are discussed below.

The NRZ-L code is easily derived from the normal flow of digital data in a system. It is highly favored because it is very compatible with different types of digital equipment and very high bit packing densities are relatively easy to achieve. However, the NRZ-L code has two major disadvantages. It is not a self-clocking code so it must contain a separate clock recording or other method of synchronization. Also, the power spectrum of the NRZ-L code contains a large amount of low-frequency components. Therefore, low tape speeds cannot be used because electromagnetic recording and reproducing heads do not have the DC response and bandwidth required by the low-frequency components of the code at low tape speeds. This is true even if an equalization network is used when reproducing the signal.

In the Manchester II or Bi-$\phi$-L method, a digit "one" is recorded as a single cycle of a square wave and a digit "zero" is recorded as a single cycle of a square wave shifted 180° from the one square wave. A flux reversal in one direction is employed to indicate the digit one and a flux reversal in the opposite direction is employed to indicate the digit zero. This method has the advantage that a flux reversal is provided for each digit whether it is a zero or a one. The Manchester method is a representative member of the family of codes which are often called bi-phase codes. Some other codes in this family are called Bi-phase-S and Bi-phase-M. The bi-phase codes contain a smaller amount of low-frequency components, but they require maximum of 2 transitions per bit (a statistical average of 1.5), which necessitates wider recording bandwidth. Therefore, they have been used only for low-density digital recording.

Another family of codes is the so-called "double density" codes, so called since they are theoretically capable of double the density of the bi-phase codes. A code of this type is described in U.S. Pat. No. 3,108,261 by Armin Miller entitled "Recording and/or Reproducing System". Codes of this type are also called delay modulation codes. See, for example, U.S. Pat. No. 3,414,894 by G. V. Jacoby entitled "Magnetic Recording and Reproducing of Digital Information". These codes utilize three different delay periods, also called three different phases, to represent the encoded data and require a maximum of one magnetic flux transition to represent one bit. Other double density codes can be generated from the known bi-phase codes by dividing by two or by using sets of rules similar to those described in the patents mentioned above.

These double density codes contain substantial DC and low-frequency components which cause a phenomenon known as baseline galloping, baseline shift, and baseband wander. This is shown in FIG. 2, where the dashed line indicates the ideal zero crossing threshold, which has been shifted up in accordance with the DC component for the pattern represented by the code and the low-frequency response of the recording apparatus. Different tape recorders and different data patterns produce different DC components and these DC components are not preserved through playback. Prior solutions have attempted to lessen the effect of this shift by reducing the recording density and employing a voltage feedback related to both the detected bit pattern and low-frequency response of the recording apparatus. Nevertheless, when the tape speeds are reduced below a few inches per second, frequency compensation becomes extremely difficult because the limited passband of the recording apparatus attenuates the lower frequency portion of the power spectrum so much that the delay periods representing the recorded information are distorted. For example, the low end frequency response of mos instrumentation tape recorders which are compatible with the Inter-Range Instrumentation Group (IRIG) telemetry standards of the U.S. Navy and Air Force is approximately 100 Hz.

One attempt to provide a code without a DC component is described in U.S. Pat. No. 3,863,025 by Gonsewski, et al., entitled "Data Transmission Method". Note that this patent describes a system where the direction of three flux changes is used to represent each bit, each group of three flux changes indicating the presence of a one or a zero. Therefore, this technique, intended for data communication applications, would not be useful in a recording and reproducing system since the bit packing density would be very low. This is because of reasons similar to those stated above with respect to the bi-phase codes.

Another data communications technique employing a bipolar pulse technique is used in the carrier signaling systems manufactured by Western Electric. This technique utilizes a code designated T1 and is described in an article entitled "The T1 Carrier System" by K. E. Fulty and D. B. Penick in the September 1965 issue of "The Bell System Technical Journal". Since this technique is not self-clocking, it is particularly unsuited to recording and reproducing systems where a difference in tape speed during the recording and reproducing operations is desired. This code and the Gonsewski code described above were both designed for data communications applications.

The present invention provides a method for producing a new family of codes which are self-clocking, have no DC component, and require a maximum of one flux change per bit of information recorded. The preferred embodiment is designed for use with any double density type of code. However, the present invention can also be used to enhance the application of other codes, such as the bi-phase codes. For example, using a bi-phase code input, the lower frequencies may be suppressed to match the bandwidth of a particular recorder or transmission line.

SUMMARY OF THE INVENTION

In accordance with the preferred embodiment, a phase modulated unipolar digital signal is transformed into a bipolar digital signal of constant pulse width. The pulse width is equal to one clock cycle of the basic clock signal of the unipolar digital signal. This varies if the input signal is embodied in a code other than a double density code, e.g., the pulse width is equal to a half clock cycle for bi-phase code inputs. This bipolar signal is then impressed on a magnetic medium or coupled to a transmission line in any one of the conventional methods. When the bipolar digital signal is received, it is converted back to the original encoded unipolar digital signal by a differentiator and a zero crossing detector.

DESCRIPTION OF THE DRAWINGS

FIG. 3 is a block diagram showing a digital recording and reproducing system in accordance with the present invention.

FIG. 4 shows some signal waveforms of the system in FIG. 3.

DESCRIPTION OF THE PREFERRED EMBODIMENT

Figure 1:
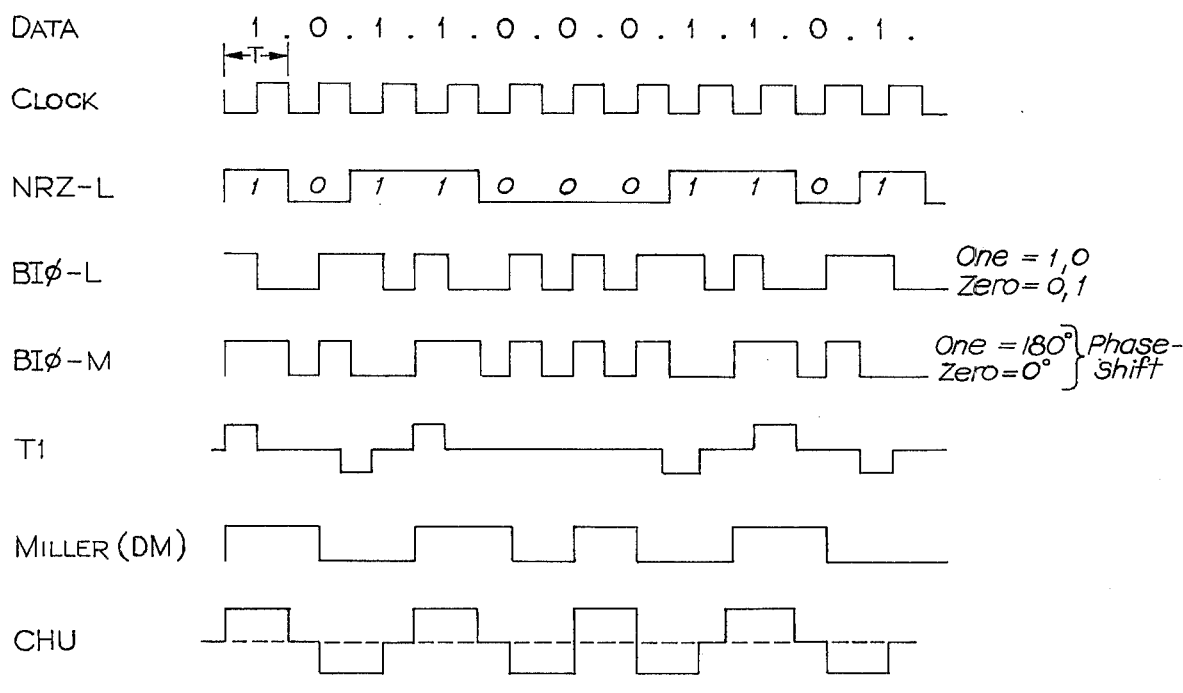
FIG. 1 shows waveforms of some pulse code modulation (PCM) codes for various data patterns.
Figure 2:
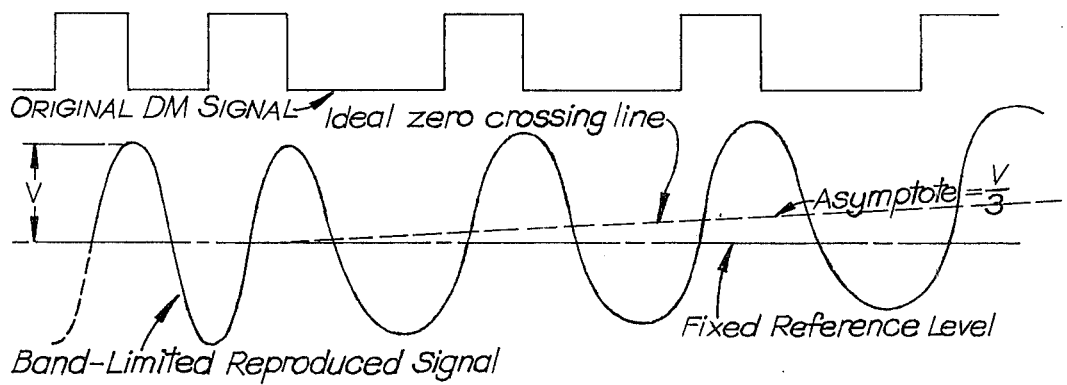
FIG. 2 shows the phenomena known as base line shift and a typical circuit for attempting correction of the problem.
Figure 2:
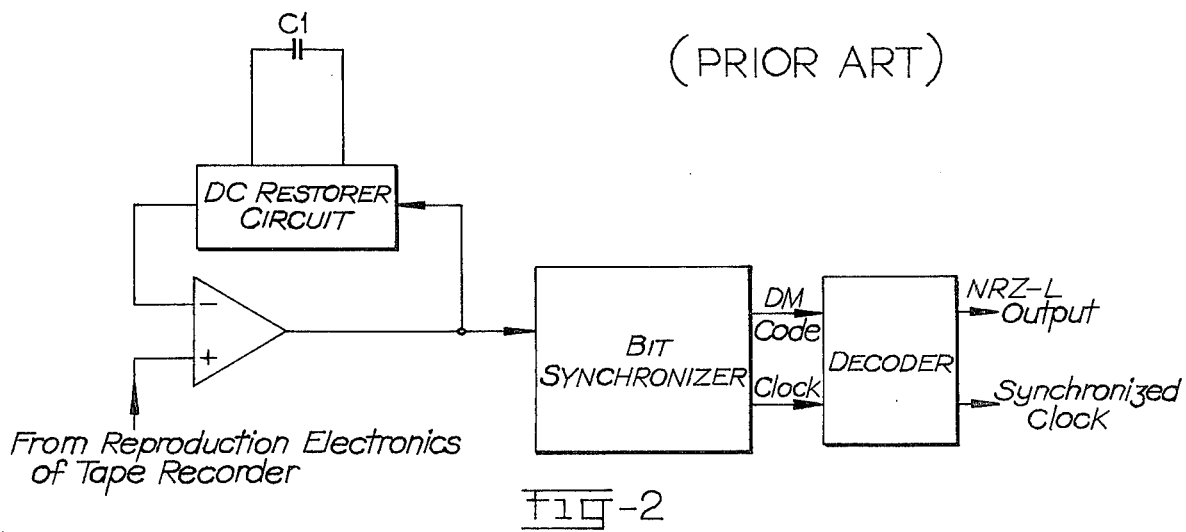

Referring to FIG. 3, there is shown a recording and reproducing system which receives an input signal representing digital data on line 25. The signal received on line 25 is encoded by a three-phase encoder 1 and then converted to a bipolar digital signal of constant pulse width by a transition detector 3, a divider circuit 2, a level adjustment circuit 28, a gate 10, and an amplifier 9. The bipolar signal produced is coupled to recording head 11, to be recorded on a magnetic medium 12.

Three-phase encoder 1 receives both the digital signal on line 25 and a clock signal on line 26 which is in-phase with and twice the frequency of the basic clock period used by the digital signal on line 25. The clock signal on line 26 is coupled to divider circuit 2, which comprises two leading edge triggered flip-flops wherein the reset signal overrides the clock input. Potentiometer 4 and amplifier 5 are provided to enable adjustment of the amplitude of the signal presented to amplifier 9 through resistors 6 and 8. The values of resistors 6, 7 and 8 are equal. Amplifier 5 also acts as an impedance converter to prevent overloading divider circuit 2.

In response to the clock signal on line 26 and the digital signal on line 25, three-phase encoder 1 produces a three-phase delay modulated signal on line 29 which is coupled to a transition detector 3 and to gate 10. Transition detector 3 produces a narrow output pulse whenever the signal on line 29 changes states. In other words, transition detector 3 has bidirectional triggering. Divider circuit 2 is reset each time transition detector 3 provides a pulse on line d. Various waveforms of the circuit described above are shown in FIG. 4.

The output signal from three-phase encoder 1 is coupled to amplifier 9 through gate 10. Gate 10 has an open collector or open drain output and is coupled to the non-inverting input of amplifier 9. Gate 10 controls the gain of the output signal from amplifier 9, the gain of amplifier 9 being either +1 or −1. When the signal on line 29 is a low voltage (logic state zero), the output of gate 10 will produce a short to ground on line 20 which causes the output from amplifier 9 to be a negative voltage. When the signal on line 29 is a high voltage (logic state one), gate 10 will present a high impedance on line 20 and the output of amplifier 9 will therefore be a positive voltage. However, whenever the output of amplifier 5 is a zero voltage, the output of amplifier 9 will also be a zero voltage irrespective of the state of the signal on line 20.

The output of amplifier 9 is coupled to a suitable recording head to be impressed on the magnetic tape 12. Instead of the recording head, the output of amplifier 9 may be coupled to a band-limited transmission line.

In the preferred embodiment, a reproducing head 13 is employed to read the recorded digital information on magnetic tape 12. The signal from reproducing head 13 is processed by circuit 14, which contains a preamplifier and an equalizer circuit. The signal output from circuit 14 is coupled to differentiator 16, which converts the output signal from circuit 14 into a rectangular-shaped signal. The output signal of differentiator 16 is coupled to a zero crossing detector 17 whcih reshapes the signal from the differentiator and outputs the reproduced unipolar digital signal to three-phase decoder 18 for further decoding. Waveforms of the recording and reproducing circuits described above are shown in FIG. 4. Note that the present invention is not limited to any particular variety of three-phase encoder 1 or three-phase decoder 2. The preferred embodiment uses the Miller Code, but the choice of particular circuits to provide encoding and decoding and the choice of a particular code for the initial encoding is not part of the present invention.

In FIG. 4, the three-phase encoded digital signal waveform from divider 2 is shown on line c. The output signal waveform from transition detector 3 is shown on line d. The output signal waveform from divider 2 is shown on line e. Amplifiers 9 receives the signal on line c from three-phase encoder 1 through gate 10. It is received at its non-inverting input. Amplifier 9 receives the signal on line e through level adjustment circuit 28 and receives the signal from level adjustment circuit 28 through resistors 6 and 8. The signals shown on lines c and e cause amplifier 9 to produce the bipolar digital signal shown on line f.

When the system reproduces the recorded data, an analog signal similar to that shown on line g is produced at the output of circuit 14. Differentiator 16 transforms the signal on line g into the rectangular-shaped signal shown on line h. Typically, this signal contains some alternating current (AC) components. These AC components are removed by zero crossing detector 17 which produces the digital signal shown on line j.

In summary, the preferred embodiment converts digital data encoded in a double-density or three-phase code as follows: All positive and negative pulses have a constant time period, 2T, where T represents one-half the full clock period of the original data. The positive pulses are positioned at the leading edges of the double-density code signal pulses while the negative pulses are positioned at the trailing edge of the signal pulses.

I claim:

1. A method for recording on magnetic tape encoded digital data, the method comprising the steps of:
   generating a unipolar digital signal having transitions between a first state and a second state in response to said digital data, said unipolar digital signal representing said data through the use of preselected delay periods between said transitions and having no more than one transition for each bit represented;
   generating a bipolar digital signal in response to said unipolar digital signal by alternately producing a positive pulse, then a negative pulse, said pulses being of approximately equal duration and being spaced at intervals approximately equal to the delay periods between the transitions between said first and second states of said unipolar digital signal:
   holding said bipolar signal at an intermediate potential when not producing said positive and negative pulses; and
   producing magnetic impressions on said magnetic tape in response to said bipolar digital signal.

2. The method as in claim 1 wherein the positive and negative pulses have a pulse width substantially equal to the period of a timing signal representing the basic clock period of said encoded digital data and the pulse width is equal to the minimum delay period between said transitions.

3. Apparatus for recording representations of digital data comprising a series of ones and zeroes, each one or zero being one bit, onto magnetic tape, said apparatus comprising:
   first circuit means for providing a unipolar digital signal having transitions between a first state and a second state in response to said digital data, said unipolar digital signal representing said digital data through the use of preselected delay periods and having no more than one transition between said first and second states to represent each bit;
   generating means for providing bipolar digital signal having alternate positive and negative pulses and having an intermediate potential during intervals between said positive and negative pulses, said generating means alternately providing a positive then a negative pulse in response to the transitions of said unipolar digital signal
   means coupled to the generating means for producing magnetic impressions on said magnetic tape in response to said bipolar digital signal.

4. The apparatus of claim 3 wherein the generating means includes control means for determining the occurrence and duration of the intermediate potential in response to a timing signal representing the timing of the transitions of the unipolar digital signal.

5. The apparatus of claim 4 wherein the control means comprises:
   means for detecting a transition in said unipolar signal and for producing an output signal in response thereto; and
   a divider circuit coupled to the means for detecting a transition for producing a digital control signal in response to the logical combination of the output signal and the timing signal.

6. The apparatus of claim 5 wherein the generating means further comprises:
   an amplifier coupled to the divider circuit for producing said bipolar digital signal in response to said unipolar digital signal and said digital control signal.

7. The apparatus of claim 6 wherein the amplifier comprises:
   inverting input means for receiving the digital control signal;
   non-inverting input means for receiving the unipolar digital signal; and
   output means for producing the positive and negative pulses of the bipolar digital signal in response to said unipolar digital signal and for producing said intermediate potential in response to the digital control signal irrespective of the state of said unipolar digital signal.

8. The apparatus of claim 7 further comprising means coupled to the magnetic tape for reproducing said magnetic impressions on the magnetic tape, wherein said means for reproducing comprises:
   reproducing means coupled to the magnetic tape for producing a first electrical signal in response to the magnetic impressions; and
   a differentiator circuit coupled to the reproducing means for producing a second electrical signal in response to the first electrical signal.

9. The apparatus of claim 8 wherein the means for reproducing further comprises threshold detection means coupled to the differentiator circuit for providing a digital output signal in response to the second electrical signal.

10. The apparatus of claim 9 wherein the means for reproducing further comprises:
   means for decoding the digital output signal and for producing signals representing the encoded digital data; and
   means for producing a clock signal related to the encoded digital data in response to the digital output signal.

* * * * *

UNITED STATES PATENT AND TRADEMARK OFFICE
CERTIFICATE OF CORRECTION

PATENT NO. : 4,017,903
DATED : April 12, 1977
INVENTOR(S) : Peter F. Chu

It is certified that error appears in the above-identified patent and that said Letters Patent are hereby corrected as shown below:

Column 2, line 59, "mos" should read -- most --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*